UNITED STATES PATENT OFFICE.

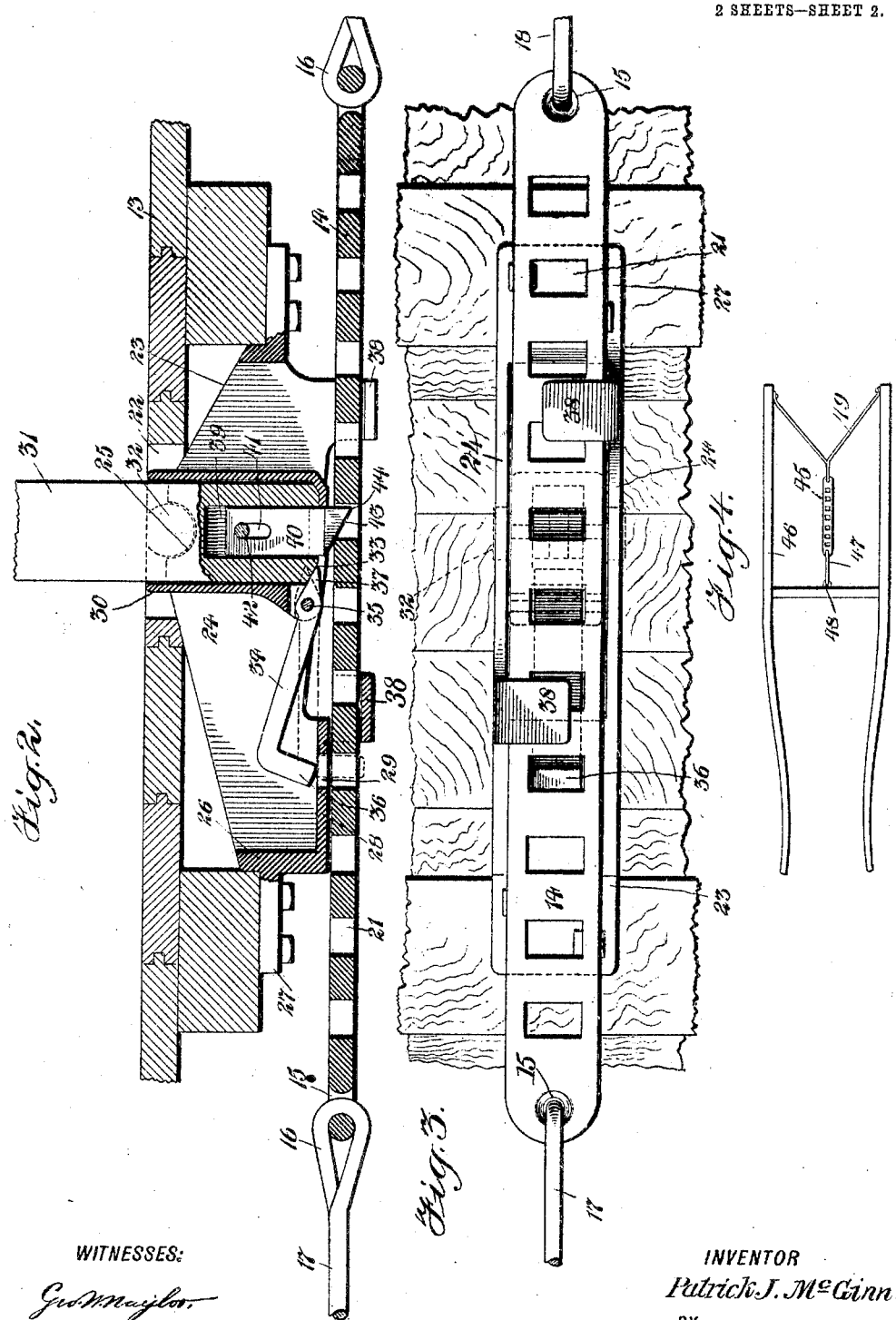

PATRICK JOSEPH McGINN, OF BULAWAYO, MATABELELAND, SOUTH AFRICA.

BALANCE-ADJUSTER FOR VEHICLES.

No. 802,773. Specification of Letters Patent. Patented Oct. 24, 1905.

Application filed February 11, 1905. Serial No. 245,235.

*To all whom it may concern:*

Be it known that I, PATRICK JOSEPH MC-GINN, a subject of the King of Great Britain, and a resident of Bulawayo, Matabeleland, South Africa, have invented a new and Improved Balance-Adjuster for Vehicles, of which the following is a full, clear, and exact description.

My invention relates to vehicles and concerns itself especially with the construction of a balance-adjuster, which is intended to be used particularly in connection with two-wheeled vehicles for the purpose of adjusting the body of the vehicle over the axle, distributing or adjusting the weight of the body between the axle and the shafts.

The object of the invention is to produce a simple arrangement for effecting the adjustment suggested in an easy manner without necessitating the driver's descending from the vehicle.

The invention consists in the construction and combination of parts to be more fully described hereinafter and definitely set forth in the claims.

Reference is to be had to the accompanying drawings, forming a part of this specification, in which similar characters of reference indicate corresponding parts in all the figures.

Figure 1 is a perspective view of a road-cart to which my invention has been applied, certain parts being broken away to illustrate more clearly its application. Fig. 2 is a longitudinal section taken through the principal part of the mechanism and showing a portion of the floor of the cart also in section, this view being upon an enlarged scale. Fig. 3 is substantially a reverse plan view of the parts shown in Fig. 2, and Fig. 4 is a plan view illustrating a modified arrangement which may be used in connection with the invention.

Referring more particularly to the drawings, 1 represents the body of a road-cart of a common form. To the under side of this body transverse straps 2 are attached, the same extending beyond the sides of the body and formed with upwardly-turned extremities 3, terminating in sleeves 4. These sleeves are provided with bores and are adapted to slide upon horizontal bars 5, which bars constitute parts of brackets 6, which are attached to the under side of the frame 7 of the vehicle. By this arrangement it should be understood that while the body is supported upon the frame the manner in which it is supported enables the body to be moved in a forward or rearward direction or transversely with respect to the axle 8. In order that the vehicle may be easy-riding, springs 9 of a suitable form are arranged between the frame 7 and the axle 8, as indicated.

The frame 7 preferably includes a rear cross-bar or tail-bar 10 and a forward cross-bar 11, to which a swingletree 12 may be attached, as shown.

At a suitable point beneath the floor 13 of the vehicle there is mounted a bar 14, preferably made of iron and having its wide face or flat side disposed horizontally. In the extremities of this bar openings 15 are formed, which receive eyes 16, formed at the extremities of rods 17 18. These rods 17 18 are offset at their outer extremities to form anchors 19 20, which anchors are attached in any suitable manner, as shown, to the cross-bar 10 and the cross-bar 11.

The bar 14 is provided throughout its length with a plurality of openings 21, preferably of rectangular form, as shown, and disposed an equal distance apart. Above the bar 14, preferably substantially over its middle point, the floor 13 is provided with an opening 22, and beneath this opening a bracket 23 is attached to the under side of the floor in any suitable manner, as shown. This bracket comprises side plates 24, which are disposed vertically, and the edges of these side plates incline upwardly and are concaved or cut circumferentially to form bearings 25, elevated with respect to the bracket, as indicated. These side plates 24 are formed integral with ends 26, provided with flanges 27, by means of which the bracket is attached. Furthermore, the side plates 24 are connected by a bottom web 28, disposed at their lower edges and preferably situated toward the rear end of the bracket. The bracket is mounted and so constructed that when the parts are in position this web 28 will lie adjacent to the upper face of the bar 14.

In the web 28 an opening 29 is formed which is preferably of substantially the same form as the openings 21, referred to above, and adapted to register therewith for a purpose which will appear hereinafter.

A socket 30 is provided which opens upwardly, as shown, and is adapted to receive the lower extremity of a removable lever 31.

This socket is received in the space between the side plates 24. Near its upper extremity it is formed with pintles or gudgeons 32, which are received, as indicated, in the aforesaid bearings 25. The lower extremity of this socket lies adjacent to the upper face of the bar 14, as shown, and a portion of the lower face of the socket is removed, so as to form an opening 33. Adjacent to this opening in the rear wall of the socket a coupling or lock 34 is pivotally attached at 35. This coupling or lock consists of a normally substantially horizontal bar having a lateral extension 36, which normally occupies the opening 29, projecting below the same and into any one of the openings 21 in the bar 14. In dotted lines in Fig. 2 this lock or coupling is represented in the position referred to. Beyond the pivot-point 35 of the lock the same is formed into a projecting toe 37, which extends into and through the opening 33, projecting into the interior of the bottom of the socket 30, as will be readily understood. By this arrangement it should be readily understood that the lock 34 affords a simple means for locking the body of the vehicle upon the bar 14.

In order to prevent any undesirable swaying movement of the bar 14, the same is supported upon its under side by means of projecting wings 38, which are integral with the side walls 24 and project, respectively, therefrom in opposite directions.

The body may be disengaged at any time and moved forwardly or rearwardly in order to adjust the same. To this end the lever 31, referred to above, is provided, the said lever having in its lower extremity a socket or pocket 39, in which there is slidably mounted a pinch-block 40. The said block has an elongated slot 41 in the upper portion thereof, through which slot passes a pin 42, fixed in the side of the lever, as will be readily understood. The lower extremity of this pinch-block 40 projects below an extremity of the lever 31, as indicated, and its bottom face 43 is preferably inclined, as shown, longitudinally with respect to the bar 14. The lower extremity of the lever 31 when applied in the socket as shown in Fig. 2 is adapted to abut against the projecting toe 37 of the lock 34 in such a manner as to raise the rear portion or body of the lock, disengaging the extension 36 thereof from the bar 14 in the manner indicated. When the lever is applied as shown, the connection between the body and the bar 14 will be broken. If it is desired to adjust the body in a rearward direction, the handle of the lever will then be pushed forwardly. As the socket 30 moved rearwardly the inclined face 43 would ride up upon and over the upper face of the bar 14, passing freely upwardly in the pocket 39. If the lever were rocked sufficiently, the sharpened toe 44 of the pinch-block 40 would eventually drop down into the next or adjacent opening in the bar, whereupon a reverse movement of the lever would operate to move the body of the vehicle rearwardly, it being understood that the toe 44 of the pinch-block would operate as a fulcrum for this purpose. It should be understood that the form of the lower portion of the lever 31 is symmetrical, or substantially so, so that if it were desired to move the body of the vehicle forwardly instead of rearwardly, as suggested, the lever would be turned around and applied in an opposite position, so that the inclined face 43 of the pinch-block would incline upwardly toward the front of the vehicle. With this new position for the lever the lock 34 would be disengaged in the same manner as before and the rocking of the lever bring about substantially the same operation of the pinch-block as mentioned above, the only exception being that the body of the vehicle would be moved forwardly instead of rearwardly. Upon removing the lever of course the lock 34 would descend of its own weight, so as to lock the body in the new adjusted position to the bar 14.

From the description given above it would appear that the bar 14 substantially constitutes a rack, which may be engaged by the lock at a plurality of points, so as to lock the body in an advanced position or otherwise.

The lever 31 would of course normally not be in sight, but would be stowed away somewhere in the body of the vehicle, where it could be conveniently found should it become necessary to adjust the body as suggested. In Fig. 4 a modified construction is shown, in which a rack-bar 45 is represented as disposed near the middle line of the frame 46. With this construction of course the opening 22 in the floor will be at substantially the middle point of the body, as will be readily understood. The forward extremity of the bar 45 will be supported upon a rod 47, anchored to the forward cross-bar 48, and the rear extremity of the bar 45 will be supported upon a Y-brace 49, the rear forks whereof are attached to the rear extremities of the side bars of the frame, as indicated.

Having thus described my invention, I claim as new and desire to secure by Letters Patent—

1. In a vehicle, in combination, an axle, a body movable with respect to the same, a removable lever, means operated thereby for adjusting the position of said body, means for locking said body, and automatic means for unlocking said body by the application of said lever.

2. In a vehicle, in combination, a body, a bar disposed longitudinally with respect to the same and constituting a rack, a lever mounted on said body and engaging said bar for advancing said body thereupon, and means for locking said body to said bar in a plurality of positions.

3. In a vehicle, in combination, a body, a bar disposed longitudinally with respect to the same and having openings therethrough, a lock carried by said body and adapted to engage said openings respectively to lock said body to said bar, and means engaging said bar for advancing said body with respect to the same.

4. In a vehicle, in combination, a body, a bar disposed longitudinally with respect to the same, a lock for attaching said body to said bar, and a lever adapted to advance said body with respect to said bar, the said lever engaging said lock to disconnect the same.

5. In a vehicle, in combination, a movable body, a socket for a lever, a member adapted to lock said body in a plurality of positions, and a lever adapted to be engaged in said socket and constituting means for advancing said body, said lever engaging said locking member to disconnect said body.

6. In a vehicle, in combination, a movable body, a socket adapted to receive a lever, a lock for fixing said body in a plurality of positions, a lever adapted to be received in said socket, and means whereby said lever may advance said body, said lock projecting into the path of said lever.

7. In a vehicle, in combination, a rack, a body movable longitudinally with respect to the same, a pivoted socket, a lever received in said socket and engaging said rack, and a lock carried by said socket and adapted to fix said body to said rack, said lever engaging said lock to disconnect the same.

8. In a vehicle, in combination, a rack, a body movable longitudinally with respect to the same, a pivoted socket, a lock carried thereby, projecting into said socket and affording means for locking said body to said rack, and a lever adapted to engage said socket and said rack to advance said body, said lever engaging said lock within said socket.

9. In a vehicle, in combination, a movable body, a rack disposed longitudinally with respect to the same, a socket having an axis of rotation, a lever adapted to slide into said socket, and a lock lying in the path of said lever and adapted to fix said body.

10. In a vehicle, in combination, a frame, a body, one of said parts carrying brackets, the other of said parts carrying sleeves slidably mounted upon said brackets, a rack disposed longitudinally with respect to said body and fixed to said frame, a lever engaging said rack to advance said body, and means for locking said body in a plurality of positions.

11. In a vehicle, in combination, a frame, a body, brackets having longitudinally-disposed bars carried by said frame, sleeves carried by said body and slidably mounted upon said bars, a rack disposed longitudinally with respect to said body, a lever engaging said rack to advance said body, and means for locking said body to said rack in a plurality of positions.

12. In a vehicle, in combination, a movable body, a bracket carried thereby, a longitudinally-disposed rack adjacent to said bracket, a lock normally projecting from said bracket and engaging said rack, and a lever adapted to engage said rack to advance said body said lock projecting into the path of said lever to disconnect itself.

13. In a vehicle in combination, a movable body, a bracket carried thereby and having an opening in the wall thereof, a rack lying adjacent to said opening and disposed longitudinally with respect to said body, a pivoted socket carried by said bracket, a lock carried by said socket and normally extending through said opening to engage said rack, and a lever received in said socket and engaging said rack said lever engaging said lock to disconnect the same.

14. In a vehicle, in combination, a movable body, a bracket carried thereby and having an opening in the wall thereof, a rack disposed longitudinally with respect to said body, a socket pivotally mounted upon said bracket, a lock carried by said socket normally projecting through said opening, said rack having means for engaging said lock at a plurality of points, and a lever adapted to slide into said socket to engage said rack, said lock projecting into the path of said lever as it slides in the said socket.

15. In a vehicle, in combination, a movable body, a rack, a lever mounted on said body and having an axis of rotation disposed transversely of said rack, and a member loosely carried by said lever and presenting an inclined point engaging said rack.

16. In a vehicle, in combination, a movable body, a fixed rack, a lever having an axis of rotation upon said body disposed transversely of said rack, and a sliding block carried by said lever and presenting a toe with an inclined face, engaging said rack.

17. In a vehicle, in combination, a movable body, a bar disposed longitudinally with respect to said body, and having a plurality of openings therein, a socket having an axis of rotation and carried by said body, a lever received in said socket, a movable block carried by said lever and adapted to engage said openings, said block having an abrupt forward face for engaging said bar, and an inclined rear face.

18. In a vehicle, in combination, a movable body, a bar disposed longitudinally with respect to said body and having a plurality of openings therethrough, a bracket carried by said body and having an opening in the wall thereof adjacent to said bar, a pivoted socket carried by said bracket, a lock pivotally carried by said socket and having an extension normally lying in said opening in said bracket, and an alining opening in said bar, a removable lever adapted to be thrust into said socket, said lock projecting into said socket to engage said lever, said lever having a socket, and a movable block carried in said last-named socket and having a projecting toe adapted to engage the openings of said bar.

19. In a vehicle, in combination, a movable body, a pivoted socket carried thereby, a rack lying adjacent to said socket, a lever, and a movable block carried by said lever and adapted to engage said rack to advance said body, said block having an inclined rear face adapted to ride over said rack, said lever being reversible in said socket to advance said body in either direction.

20. In a vehicle, in combination, a movable body, a bracket carried thereby presenting side walls, a rack disposed longitudinally with respect to said body at the lower portion of said bracket, said side walls having wings constituting guides for said rack, the upper edges of said side walls constituting bearings, a socket having gudgeons lying in said bearings and disposed in the space between said side walls, a lever adapted to be received by said socket and engaging said rack, and a lock controlled by said lever for fixing said body to said rack.

In testimony whereof I have signed my name to this specification in the presence of two subscribing witnesses.

PATRICK JOSEPH McGINN.

Witnesses:
C. F. WEBB,
G. M. KIRSCHBAUM.